July 6, 1965
A. M. MOEN
3,192,943
CARTRIDGE BALL VALVE
Filed June 27, 1962
3 Sheets-Sheet 1
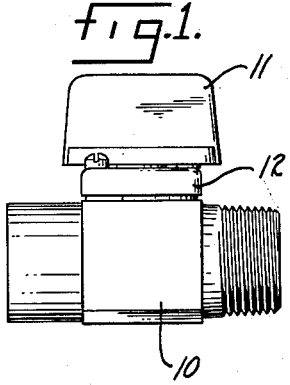
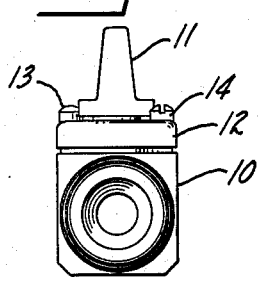
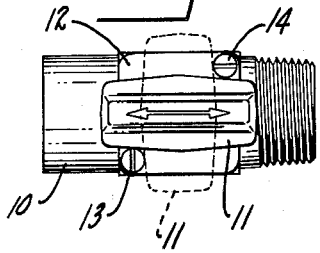
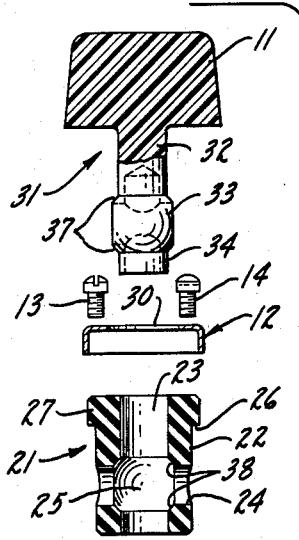
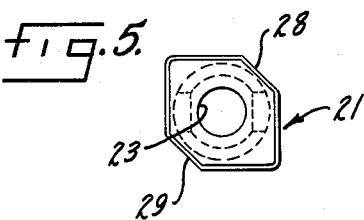
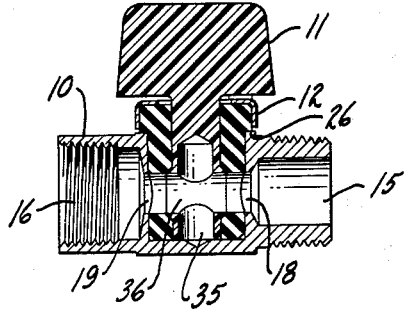
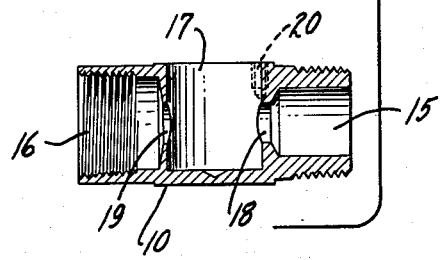
INVENTOR
Alfred M. Moen,
BY Parker & Carter
Attorneys.

July 6, 1965 A. M. MOEN 3,192,943
CARTRIDGE BALL VALVE
Filed June 27, 1962 3 Sheets-Sheet 2
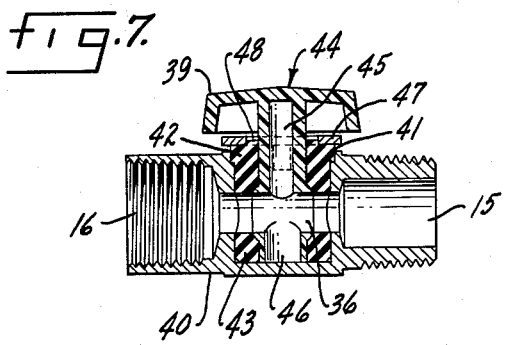
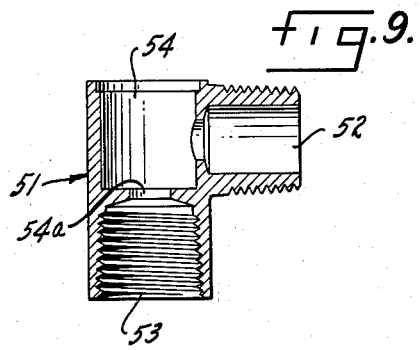
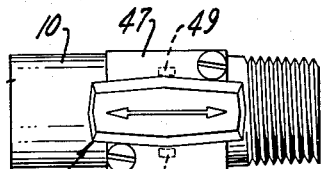
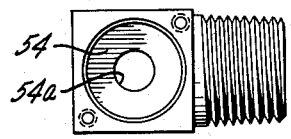
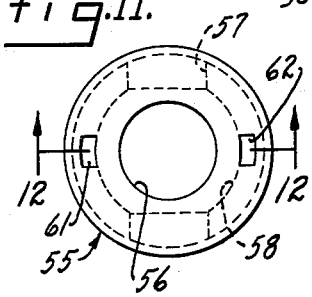
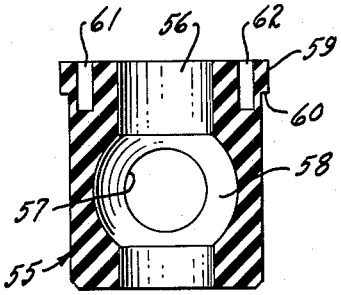
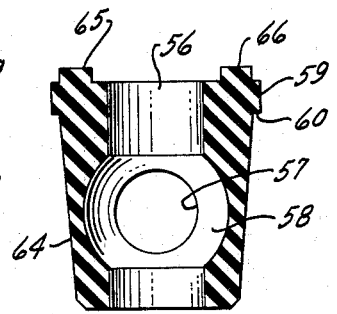
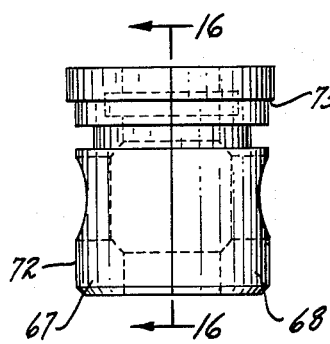
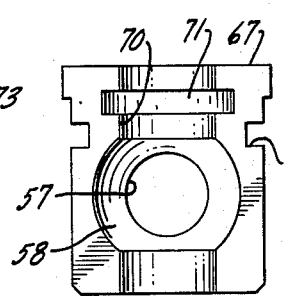
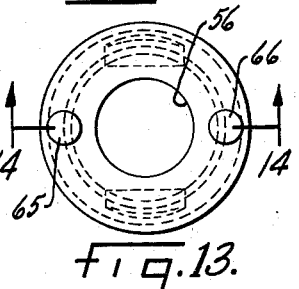
INVENTOR.
Alfred M. Moen,
BY Parker & Carter
Attorneys.

July 6, 1965  A. M. MOEN  3,192,943
CARTRIDGE BALL VALVE
Filed June 27, 1962  3 Sheets-Sheet 3
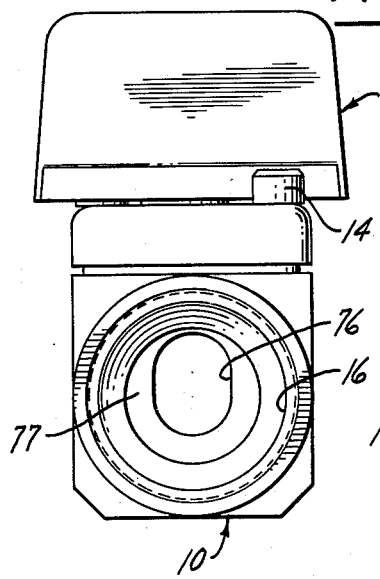
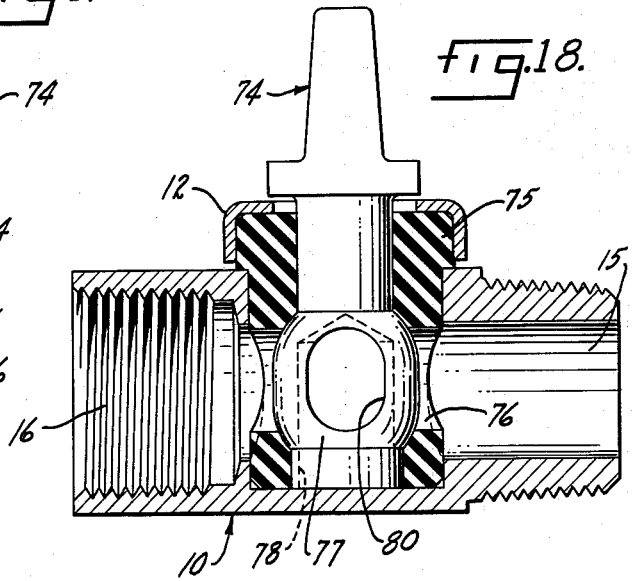
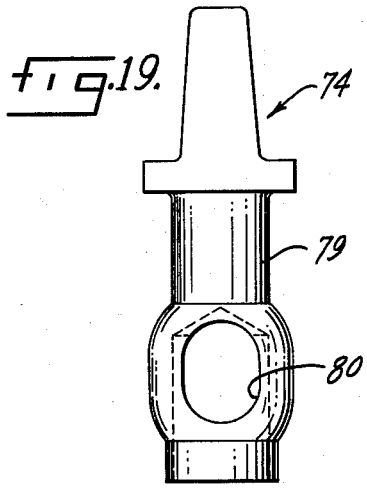
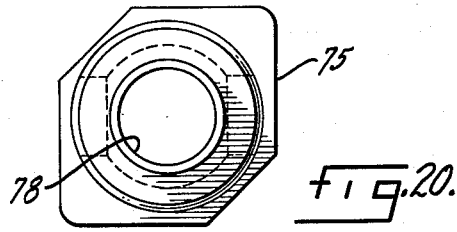
INVENTOR.
Alfred M. Moen,
BY Parker & Carter
Attorneys.

United States Patent Office 3,192,943
Patented July 6, 1965

3,192,943
CARTRIDGE BALL VALVE
Alfred M. Moen, 25 Lakeview Drive, Grafton, Ohio
Filed June 27, 1962, Ser. No. 205,606
7 Claims. (Cl. 137—315)

This invention relates to valves, and particularly to a ball-type stop valve assembly.

A primary object of the invention is to provide a ball-type valve having a yieldable cartridge assembly including a handle and stem assembly, the cartridge assembly performing the dual functions of a valve seat and a seal for the valve thereby eliminating auxiliary parts for additional seals, and additional seals.

Another object is to provide a ball-type valve having a rubber cartridge assembly which is insertable and removable as a unit, said cartridge assembly including a valve and valve handle.

Another object is to provide a valve unit for a ball-type valve capable of use, without alteration or adjustment, in either a straight through or an L-type valve body.

Yet a further object is to provide, in a ball-type valve, a rubber cartridge assembly for a valve unit which may be easily grasped and loosened by a tool for removal and replacement whenever necessary without danger of shearing the rubber portion of the cartridge.

A further object is to provide a ball-type stop valve in which several parts perform multiple functions, thereby resulting in a stop valve having a minimum number of parts.

Yet a further object is to provide a ball-type stop valve having a rubberlike valve insert which, in conjunction with a combination hold-down and handle stop means, performs the dual functions of preventing leakage from the interior to the exterior of the valve body, and across the valve within the valve body.

Yet another object is to provide a valve in which the bulk of the movable parts, including a rubberlike insertable and removable cartridge, may be made of molded plastic material.

Yet a further object is to provide a ball-type valve in which the valve and valve seat assembly may be quickly removed as a unit, and a new assembly interchanged without removing the valve body from the line in which it is connected.

Another object is to provide an easily insertable and removable cartridge assembly for a ball valve, the assembly having a valve seat insert formed in two identical halves and made of a non-expandable material, such as plastic, suitable for forming a good sealing surface, the two halves, when assembled, forming internal and external seats for the reception of sealing members which prevents leakage through the assembly and between it and the valve body respectively.

Other objects and advantages will become apparent upon reading the following description of the invention.

The invention is illustrated more or less diagrammatically in the accompanying drawings, wherein:

FIGURE 1 is a side view of a straight-through type ball valve of the present invention;

FIGURE 2 is an end view of the ball valve of FIGURE 1;

FIGURE 3 is a top plan view of the ball valve of FIGURE 1;

FIGURE 4 is an exploded view of the ball valve of FIGURES 1–3;

FIGURE 5 is a top plan view of the valve seat insert shown in FIGURE 4;

FIGURE 6 is a sectional view of the assembled ball valve;

FIGURE 7 is a sectional view through another embodiment of the invention;

FIGURE 8 is a top plan view of the ball valve of FIGURE 7;

FIGURE 9 is a sectional view through an alternate form of valve body with which the valve unit of the invention may be utilized without alteration;

FIGURE 10 is a top plan view of the alternate form of valve body shown in FIGURE 9;

FIGURE 11 is a top plan view of an alternate form of valve seat insert utilizable in either one of the above illustrated valve bodies;

FIGURE 12 is a section view taken substantially along the line 12—12 of FIGURE 11;

FIGURE 13 is a top plan view of an alternate form of a valve seat insert;

FIGURE 14 is a section view taken substantially along the line 14—14 of FIGURE 13;

FIGURE 15 is a side view of another form of valve seat insert;

FIGURE 16 is a view taken substantially along the line 16—16 of FIGURE 15;

FIGURE 17 is an end view of an alternate embodiment of the invention;

FIGURE 18 is a sectional view in side elevation through the embodiment of FIGURE 17;

FIGURE 19 is a side view of the handle and stem of the embodiment of FIGURE 17; and FIGURE 20 is a bottom plan view of the valve seat insert which is shown in section in FIGURE 18.

Like reference numerals will be used to refer to like parts throughout the following description of the invention.

The exterior of the ball valve assembly is shown in FIGURES 1, 2 and 3. Visible portions include the valve body 10, handle 11, retainer plate 12, and screws 13, 14 which secure the retainer plate, and the valve seat insert of FIGURES 4–6, to the valve body. The valve body has a male connection at one end and a female at the other, and is what is commonly referred to in the trade as a straight-through type valve.

Referring now to FIGURE 4, valve body 10 includes an inlet 15 and an outlet 16. A central bore 17 is located midway between the ends of the valve body, the axis of the bore being transverse to the axis of the inlet and outlet. Short passages 18, 19 connect vertical bore 17 to the inlet and outlet, respectively. A pair of screw holes 20, only one of which is shown in FIGURE 4, are formed in the top of the body for the reception of screws 13, 14.

A valve seat insert is indicated generally at 21. The insert consists of a shank portion 22, the outside diameter of which is equal to the diameter of bore 17. An axial passage is indicated at 23, and, as best seen in FIGURES 4 and 6, extends a substantial distance along the valve insert and opens into its bottom surface. A cross passage 24 extends across the width of the shank portion. Passages 23 and 24 open into a generally spherical cavity 25.

The upper end 27 of the valve seat insert overhangs the shank to provide a shoulder 26 which rests atop the upper flat surface of the valve body 10. The cross section of the upper end is best seen in FIGURE 5. Corner areas 28, 29 have been cut away to provide clearance for screws 13 and 14 when the valve unit is assembled.

The retainer plate 12 includes a central aperture 30 and a pair of diagonally located corner holes for screws 13, 14.

Although a variety of materials may be used for the valve seat insert, the preferred material has the characteristics as to flexure and compressibility of rubber. Either natural rubber, neoprene or synthetic rubber materials may be used.

The handle 11 is part of a combination handle and stem assembly 31. The stem consists of an elongated portion 32, a ball valve section 33 and a short tubular section 34. As best seen in FIGURE 6, the stem includes an axial passage 35 and a cross passage 36. When assembled, the cross passage 36 is in axial alignment with cross passage 24 in the valve seat insert and connecting passages 18 and 19 in the valve body.

As best seen in FIGURE 4, the dimensions of the ball section 33 closely conform to the spherical cavity 25 in the valve seat insert. Shoulders 37 on the ball fit snugly against corresponding surfaces 38 in the valve seat insert.

In the embodiment of FIGURES 7 and 8, the valve body 40 is formed with a shoulder 41 upon which rests a flange section 42 of valve seat insert 43. The combination handle, stem and ball assembly 44 includes a hollow handle 39. The aperture 45 above the cross passage 36 is of a lesser diameter than the blocked off axial flow passage 46.

In this instance the retainer plate is a flat washer 47 resting on the upper end of valve seat insert 43. As best seen in FIGURE 7, the washer is apertured, the aperture corresponding to a projection 48 on the top of the valve seat insert. Preferably the projection 48 is circular. To prevent rotation of retainer 47 with respect to the valve seat insert during assembly and disassembly, and to insure removal of the valve seat insert with the retainer plate, a pair of downwardly projecting fingers 49, 50 extend into correspondingly aligned recesses in the valve seat insert.

In the embodiment of FIGURES 9 and 10 the valve body 51 is of the 90 degree L-type having inlet 52 and outlet 53. The ball valve assembly is inserted into bore 54 which terminates in a connecting passage 54a aligned with outlet 53.

A valve seat insert of the general type employed in the ball valve assembly of FIGURES 7 and 8 is illustrated in FIGURES 11 and 12. The insert 55 has an axial bore 56, a cross bore 57 and an expanded ball valve section 58. An annular flange 59 forms a shoulder 60, the shoulder 60 being adapted to rest either atop the ball valve body, as in FIGURE 6, or to be received in a recess as in FIGURE 7, depending upon the length of the valve seat insert. A pair of generally vertically oriented recesses 61, 62 are formed in the upper surface of the insert for the reception of downwardly extending prongs from a retainer plate of the type illustrated in FIGURE 7.

In the embodiments of FIGURES 13 and 14, the valve seat insert 64 is tapered. It will be understood that a correspondingly tapered bore would be provided in a suitable valve body. In this instance a pair of upwardly extending generally circular projections 65, 66 are provided for securing the valve seat insert to an appropriately designed retainer plate. The retainer plate would have a center bore of a size equal to, or preferably slightly larger than, the main bore 56, and at least a pair of smaller bores within which projections 65 and 66 would be received.

In the embodiment of FIGURES 15 and 16 the valve seat insert is formed in two halves 67, 68. An extended groove 69 is formed near the upper end of the shank 72. The shank, which is of a constant diameter, is adapted to be received in a complementary shaped valve body and terminates at its upper end in an overhanging flange 73 which may rest upon a flat exterior surface, as in the embodiment of FIGURES 1–6. An internal groove 71 for an internal seal is formed in main axial bore 70.

In this instance the valve insert might more expeditiously be assembled by placing the two halves 67, 68 radially against the handle and stem assembly rather than moving the handle and stem longitudinally into place. The valve seat insert and handle and stem assembly are then slid into place in the valve body.

In the embodiment of FIGURES 17 through 20 the handle and stem assembly 74 and valve seat insert 75 are so arranged as to provide maximum flow-through area for a given size valve. The transverse passage 76 through the insert is elliptical in shape, as best seeen in FIGURE 17, and the ball valve portion 77 has been rearranged to be snugly received within the elliptical opening 76 as in the embodiment of FIGURES 4 through 6. As best seen in FIGURE 19, the shank portion 79 of the handle and stem assembly is substantially larger than the corresponding shank portion in the earlier embodiments. As best seen in FIGURE 20, the outlet passage 78 is preferably circular although it could, within the scope of the invention, be generally elliptical in shape as is the transverse passage 80.

The use and operation of the invention are as follows:

In the embodiments of FIGURES 1 through 6 the valve assembly, which includes the handle and stem assembly 31, valve seat insert 21, retainer plate 12, and attaching screws, is formed as a removable cartridge-type unit. Since the valve seat insert 21 is made of rubber, or a material having the characteristics as to flexure and compressibility of rubber, the handle and stem assembly may be inserted longitudinally into the valve seat insert until the ball valve portion 33 comes to rest in the spherical cavity 25. The axial passage 23 will of course be deformed during the movement of the handle and stem assembly into seating engagement with the insert. The aperture 30 and the retainer plate 12 are large enough so that the ball valve portion 33 may slide easily therethrough and into place in the valve seat insert. When the cartridge is assembled to the valve body 10, screws 13 and 14 extend through the generally square-shaped retainer plate 12 and into corresponding screw holes 20 in the top of the valve body. The screws will pass through the retainer plate in the cut away areas 28, 29 of the valve seat insert. Since the top of the valve seat insert 27 is molded to the contour of FIGURE 5 and the 90 degree corners are seated within the retainer plate, the entire valve assembly may be grasped with a wrench and removed for replacement or repair, if necessary, without shearing the rubber valve seat insert.

Since the valve seat insert has a longitudinal bore 23 open at the bottom, as well as a transverse bore 24, the entire cartridge assembly may be installed in a right angle 90 degree L-type valve of the form illustrated in FIGURE 9.

The screws 13 and 14 that hold the retainer cap provide a stop for the valve and handle. In FIGURE 3 the dotted line position of the handle illustrates the fully closed condition of the valve. Screws 13, 14 limit the handle to a 90 degree swing. The retainer cap on the valve insert provides a wrenching surface for rotating the cartridge assembly to loosen it for removal.

In operation, water pressure helps to seal the valve. If, for example, the pressure is on the inlet side 15 of the cartridge, the cartridge is pushed against the opposite side of the valve body and, at the area of contact, forms a water seal. The downward pressure of the retainer cap on the upper, overhung portion 27 of the valve seat insert provides a seal between both the valve seat insert and housing, and the handle, stem and valve seat insert. Thus a good sealing effect is provided between the cartridge assembly and the valve body without the use of any auxiliary seals or additional seal-supporting structure. The retainer cap acts as a surface protector for the upper face of the valve seat insert, and at the same time provides a grip for a wrench when the valve is to be removed.

The same basic cartridge assembly of FIGURE 4 can be employed in either the straight-through type valve body of FIGURES 1 through 6, or a 90 degree L-type body as illustrated in FIGURES 9 and 10. This is made possible by the longitudinal axial passage 46. When the cartridge assembly is installed in the straight-through valve body, the passage 46 is inactive and the transverse passage 36 provides a flow path for fluid passing through the valve. When the valve is installed in a 90 degree L-type of valve body, one of the ports of transverse passage 36 is blocked off and the other active port and axial outlet 46 provide the flow path for fluid passing through the valve.

In the embodiments of FIGURES 7 and 8 the retainer plate 47 is merely a flat washer. Again, however, it is formed with a square top surface to provide a grip for wrenching and again the screws serve the dual purpose of a stop for the handle assembly 44 and a pressure member to force the valve seat insert into sealing engagement with the valve body.

The valve seat insert of FIGURES 11 and 12 is especially adapted for use with a retainer plate of the type illustrated in FIGURES 7 and 8. In this instance the interlock between the retainer and valve seat insert is provided by downwardly projecting fingers 49, 50 from the retainer plate which seat in apertures 61, 62 in the top surface of the valve seat insert.

In the valve seat insert of FIGURES 13 and 14 the sides are tapered as at 64 to aid in the insertion and removal of the cartridge assembly. In this instance the upwardly extending projections 65, 66 penetrate corresponding recesses or apertures in a retainer plate to provide an interlock between the retainer plate and the valve seat insert.

Since the mating plastic halves 67, 68 of the embodiment of FIGURES 15 and 16 are made of non-expandable material, they are assembled by placing them radially against one another and a valve and stem assembly which carries an O-ring seal for internal groove 71. Another O-ring seal is placed in external groove 69, and the assembly then slid into place in a valve body. The plastic material, Teflon for example, provides a good sealing surface. The internal ring seal prevents leakage along the valve stem and the external prevents leakage between the valve body and the cartridge. Under certain conditions a retainer plate element may be omitted.

In the embodiment of FIGURES 17 through 20 a maximum area of flow has been provided for a given ball valve diameter. The elliptical opening 80 in the handle and stem assembly provides a maximum flow area for a given size valve body, all the while retaining the other desirable holddown, sealing and adaptability to straight-through or right-angled valve bodies described in conjunction with the previous embodiments.

Although an operative form of the device has been shown, the invention is not limited to the particular details shown. Many changes may be made in the form, shape and arrangement of parts without departing from the spirit of the invention. Accordingly, it is intended that the scope of the invention be defined not by the illustrated embodiments, but by the scope of the following claims as interpreted in light of the pertinent prior art.

I claim:

1. In a ball type stop valve, a generally rigid housing, a passage therethrough and a valve chamber in communication with said passage, a relatively compressible valve liner means positioned in said chamber, one end portion of said liner means being exposed at one end of said passage, transverse and longitudinal passages extending through said liner means in communication with each other, a valve stem member in the longitudinal passage of said liner, handle means on said stem member beyond said liner means and a valve member on said stem member within said liner means, said valve member provided with a transverse passage, said stem provided with an intersecting longitudinal passage extending to its inner end, means for exerting a longitudinal compressive force on said liner, said means comprising a generally rigid part in contact with the exposed end portion of said liner means, means interlocking the rigid part and said liner means against relative rotational movement, whereby torque may be applied to the liner through said rigid part during removal of the valve seat unit, and adjustable means for holding said rigid member in adjusted position with respect to said housing and said liner means.

2. The ball type stop valve described in claim 1 wherein said liner means is divided longitudinally to form plural liner sections which together substantially completely surround said valve member within said valve chamber.

3. The ball type stop valve described in claim 1 wherein the means interlocking the rigid part and said liner means against relative rotational movement includes a depending flange formation on said rigid part which overlaps edge portions of the exposed end portion of said liner means.

4. The ball type stop valve described in claim 1 wherein the means interlocking the rigid part and said liner means against relative rotational movement includes complemental longitudinally extending interfitting elements carried respectively by said rigid part and by said liner means in longitudinally overlapping relation.

5. In a ball type stop valve, a generally rigid housing, a passage therethrough and a valve chamber in communication with said passage, a relatively compressible valve liner positioned in said chamber, transverse and longitudinal passages extending through said liner in communication with each other, a valve stem in the longitudinal passage of said liner, a handle thereon beyond said liner and a valve thereon within said liner, said valve provided with a transverse passage, said stem provided with an intersecting longitudinal passage extending beyond its inner end, means for exerting a longitudinal compressive force on said liner, said means comprising a generally rigid part in contact with the end portion of said liner, and adjustable means for holding said rigid member in adjusted position with respect to said housing and said liner, said adjustable means extending into the path of rotation of said valve handle and limiting its rotation.

6. In a ball type stop valve, a generally rigid housing, a passage therethrough and a valve chamber in communication with said passage, a relatively compressible valve liner positioned in said chamber and extending outwardly beyond said housing, transverse and longitudinal passages extending through said liner in communication with each other, a valve stem in the longitudinal passage of said liner, a handle thereon beyond said liner and a valve thereon within said liner, said valve provided with a transverse passage, said stem provided with an intersecting longitudinal passage extending to its inner end, means for exerting a longitudinal compressive force on said liner, said means comprising a generally rigid part in contact with the end portion of said liner exterior to said housing, and adjustable means for holding said rigid member in adjusted position with respect to said housing and said liner, said adjustable means extending into the path of rotation of said valve handle and limiting its rotation.

7. In a ball type stop valve, a generally rigid housing, a passage therethrough and a valve chamber open at one end and in communication with said passage, a relatively compressible valve liner positioned in said chamber and extending outwardly beyond said housing, transverse and longitudinal passages extending through said liner in communication with each other, a valve stem in the longitudinal passage of said liner, an integral handle thereon beyond said liner and an integral valve thereon within said liner, said valve provided with an intersecting longitudinal passage extending to its inner end, means for exerting a longitudinal compressive force on said liner, said means comprising a generally rigid part in contact with the end portion of said liner exterior to said housing, and adjustable means for holding said rigid member in adjusted position with respect to said housing and said liner, said adjustable means extending into the path of rotation of said valve handle and limiting its rotation.

References Cited by the Examiner
UNITED STATES PATENTS

| | | | |
|---|---|---|---|
| 860,217 | 7/07 | Jackson | 137—454.6 |
| 2,063,699 | 12/36 | Schellin | 251—317 |
| 2,735,645 | 2/56 | Freed | 251—317 XR |
| 2,766,961 | 10/56 | Meusy | 251—317 XR |
| 2,905,197 | 9/59 | Janes | 251—317 XR |
| 2,929,406 | 3/60 | Anderson | 251—317 XR |
| 3,041,036 | 6/62 | McFarland | 251—315 XR |
| 3,044,493 | 7/62 | Welty | 251—317 XR |
| 3,047,007 | 7/62 | Lunken | 251—315 XR |

ISADOR WEIL, *Primary Examiner.*